US012285767B2

(12) United States Patent
Yamazaki et al.

(10) Patent No.: US 12,285,767 B2
(45) Date of Patent: Apr. 29, 2025

(54) SOLDER PARTICLE CLASSIFYING METHOD, SOLDER PARTICLE, SOLDER PARTICLE CLASSIFYING SYSTEM, ADHESIVE COMPOSITION, AND ADHESIVE FILM

(71) Applicants: Resonac Corporation, Tokyo (JP); Toshiyuki Sugimoto, Yamagata (JP)

(72) Inventors: Shohei Yamazaki, Tokyo (JP); Hiroyuki Izawa, Tokyo (JP); Toshiyuki Sugimoto, Yamagata (JP)

(73) Assignees: Resonac Corporation, Tokyo (JP); Toshiyuki Sugimoto, Yamagata (JP)

( * ) Notice: Subject to any disclaimer, the term of this patent is extended or adjusted under 35 U.S.C. 154(b) by 0 days.

(21) Appl. No.: 18/559,618

(22) PCT Filed: May 2, 2022

(86) PCT No.: PCT/JP2022/019535
§ 371 (c)(1),
(2) Date: Nov. 8, 2023

(87) PCT Pub. No.: WO2022/239701
PCT Pub. Date: Nov. 17, 2022

(65) Prior Publication Data
US 2024/0238804 A1 Jul. 18, 2024

(30) Foreign Application Priority Data
May 11, 2021 (WO) .................. PCT/JP2021/017922

(51) Int. Cl.
*B03C 7/02* (2006.01)
*B07B 13/04* (2006.01)

(52) U.S. Cl.
CPC ................ *B03C 7/02* (2013.01); *B07B 13/04* (2013.01)

(58) Field of Classification Search
CPC .................................. B03C 7/02; B07B 13/04
(Continued)

(56) References Cited

U.S. PATENT DOCUMENTS 8,513,531 B2 * 8/2013 Trigwell .................. B03C 7/02 977/840
2019/0302564 A1 * 10/2019 van de Kamer .... G02F 1/16755

FOREIGN PATENT DOCUMENTS

CN 203990927 U * 12/2014 ............... B03C 7/02
JP H11-152598 A 6/1999
(Continued)

*Primary Examiner* — Terrell H Matthews
(74) *Attorney, Agent, or Firm* — FITCH, EVEN, TABIN & FLANNERY, LLP

(57) ABSTRACT

A method for classifying solder particles includes: a first step of forming an electric field between a first electrode 2 and a second electrode 3 included in an electrostatic attraction device, the first electrode 2 having a disposition part having electrostatic diffusivity or electrical conductivity, the second electrode 3 having an attraction part 4 having electrical insulation properties, which faces the disposition part and is provided with a plurality of opening parts 10 opened to the disposition part side, so as to cause solder particles P disposed on the disposition part to be electrostatically attracted to the attraction part 4; a second step of removing solder particles P2 attracted to areas other than the opening parts 10 of the attraction part 4; and a third step of collecting solder particles P1 accommodated in the opening parts, from the attraction part 4 that has been subjected to the second step.

8 Claims, 7 Drawing Sheets

(58) Field of Classification Search
USPC .......................................................... 209/128
See application file for complete search history.

(56) References Cited

FOREIGN PATENT DOCUMENTS

| | | | | |
|---|---|---|---|---|
| JP | 2016-160442 | A | | 9/2016 |
| JP | 2021-028895 | A | | 2/2021 |
| JP | 2021-057293 | A | | 4/2021 |
| KR | 102020615 | B1 | * | 12/2018 |
| WO | 2020/004510 | A1 | | 1/2020 |

* cited by examiner (a)

(b)

(a)

(b)

(a)

(b)

SOLDER PARTICLE CLASSIFYING METHOD, SOLDER PARTICLE, SOLDER PARTICLE CLASSIFYING SYSTEM, ADHESIVE COMPOSITION, AND ADHESIVE FILM

CROSS-REFERENCE TO RELATED APPLICATIONS

This application is a U.S. national phase application filed under 35 U.S.C. § 371 of International Application No. PCT/JP2022/019535, filed May 2, 2022, designating the United States, which claims priority from International Application No. PCT/JP2021/017922, filed May 11, 2021, which is incorporated herein by reference in its entirety.

TECHNICAL FIELD

The present disclosure relates to a method for classifying solder particles, solder particles, a solder particle classification system, an adhesive composition, and an adhesive film.

BACKGROUND ART

In surface mounting technologies for mounting an electronic device on a printed wiring substrate or the like, a solder paste obtained by mixing solder particles and a paste-like flux is used. For solder particles, usually, spherical particles having a diameter of about 100 μm or more are used.

In recent years, there is an increasing demand for miniaturization and weight reduction as well as functional improvement of electronic devices such as smartphones, personal computers, and tablets, and as a result, it is required to further improve durability and reliability of electronic devices. Therefore, it is required to maintain the gaps between electrodes and wirings constant during mounting and to suppress gap variations in each wiring.

One of the countermeasures for the above-described requirements is to make the particle size distribution of solder particles uniform. Solder particles are manufactured by various methods, and studies have been made to suppress variations in the particle size in various manufacturing methods (see, for example, the following Patent Literature 1).

CITATION LIST

Patent Literature

Patent Literature 1: Japanese Unexamined Patent Publication No. 2016-160442

SUMMARY OF INVENTION

Technical Problem

However, even with the method described in Patent Literature 1, manufactured solder particles include large amounts of defective products that can be separated by sieving, and classification of solder particles is needed to obtain monodisperse solder particles having a low degree of dispersion.

An object of the present disclosure is to provide a method for classifying solder particles, solder particles, a solder particle classification system, and an adhesive composition and an adhesive film, which include solder particles.

Solution to Problem

An aspect of the present disclosure relates to a method for classifying solder particles, the method including: a first step of forming an electric field between a first electrode and a second electrode included in an electrostatic attraction device, the first electrode having a disposition part having electrostatic diffusivity or electrical conductivity, the second electrode having an attraction part having electrical insulation properties, which faces the disposition part and is provided with a plurality of opening parts opened to the disposition part side, so as to cause solder particles P disposed on the disposition part to be electrostatically attracted to the attraction part; a second step of removing solder particles P2 that are attracted to the attraction part and are not accommodated in the opening parts, from the attraction part; and a third step of collecting solder particles P1 accommodated in the opening parts, from the attraction part that has been subjected to the second step, in which the solder particles P have an average particle size of 10 μm or more.

According to the above-described method, solder particles having a large particle size, which are not accommodated in the opening parts, can be efficiently removed by the second step, and the degree of dispersion of the solder particles P1 to be collected can be made smaller than that of the solder particles P. As a result, solder particles having a small CV value of the particle size (coefficient of variation in the particle size) can be obtained. In addition, according to the above-described method, the average particle size of the solder particles P1 to be collected can be easily changed by regulating the opening diameter of the opening parts.

From the viewpoint of reducing the CV value of the particle size of the solder particles P1 to be collected, the solder particles P may be such that the proportion of particles having a particle size of less than 10 μm is 30% by pieces or less.

With regard to the above-described method for classifying solder particles, when the average particle size of the solder particles P is designated as MDp (μm), and the opening diameter of the opening parts is designated as OD (μm), MDp/OD may satisfy 0.5 to 1.5.

Another aspect of the present disclosure relates to solder particles having an average particle size of 10 to 100 μm, a CV value of particle size of 3 to 15%, and an average degree of sphericity of 0.90 or more.

As each of the above-described solder particles has the above-described configurations, it is possible to cope with the requirements of maintaining the gaps between electrodes and wirings constant during mounting in surface mounting, and suppressing gap variations in each wiring, and at the same time, it can be said that productivity is excellent from the viewpoint that the above-described solder particles can be manufactured from solder particles manufactured by a conventional method, by using the above-mentioned method for classifying solder particles.

The solder particles may have an average particle size of 10 to 50 μm.

Another aspect of the present disclosure relates to an adhesive composition including an adhesive component and the above-described solder particles.

Another aspect of the present disclosure relates to an adhesive film including an adhesive component and the above-described solder particles.

Another aspect of the present disclosure relates to a solder particle classification system, including: an electrostatic attraction device including a first electrode having a disposition part having electrostatic diffusivity or electrical conductivity, and a second electrode having an attraction part having electrical insulation properties, which faces the disposition part and is provided with a plurality of opening parts opened to the disposition part side; a removing means for removing solder particles that are attracted to the attraction part and are not accommodated in the opening parts, from the attraction part; and a collecting means for collecting solder particles accommodated in the opening parts of the attraction part.

According to the above-described solder particle classification system, the above-mentioned method for classifying solder particles can be carried out, and solder particles having a small CV value of the particle size (coefficient of variation in the particle size) can be obtained. In addition, the average particle size of the solder particles to be obtained can be easily changed by regulating the opening size of the opening parts. Therefore, the solder particle classification system can also be applied as a manufacturing system for monodisperse solder particles.

Advantageous Effects of Invention

According to the present disclosure, a method for classifying solder particles, solder particles, and a solder particle classification system, as well as an adhesive composition and an adhesive film, which include solder particles, can be provided.

DESCRIPTION OF EMBODIMENTS

Hereinafter, embodiments for carrying out the present disclosure will be described in detail, optionally with reference to the drawings. However, the present disclosure is not intended to be limited to the following embodiments.

With regard to a numerical value range described stepwise in the present specification, the upper limit value or lower limit value of a numerical value range of a certain stage may be replaced with the upper limit value or lower limit value of a numerical value range of another stage. In addition, with regard to a numerical value range described in the present specification, the upper limit value or lower limit value of the numerical value range may be replaced with a value shown in the Examples. Furthermore, in the present specification, for convenience, aggregates of a plurality of particles are also referred to as "particles".

[Method for Classifying Solder Particles]

A method for classifying solder particles according to the present embodiment includes: a first step of forming an electric field between a first electrode and a second electrode of an electrostatic attraction device including a first electrode having a disposition part having electrostatic diffusivity or electrical conductivity, and a second electrode having an attraction part having electrical insulation properties, which faces the disposition part and is provided with a plurality of opening parts opened to the disposition part, so as to cause solder particles P disposed on the disposition part to be electrostatically attracted to the attraction part; a second step of removing solder particles P2 that are attracted to the attraction part and are not accommodated in the opening parts; and a third step of collecting solder particles P1 accommodated in the opening parts, from the attraction part that has been subjected to the second step.

Figure 1:
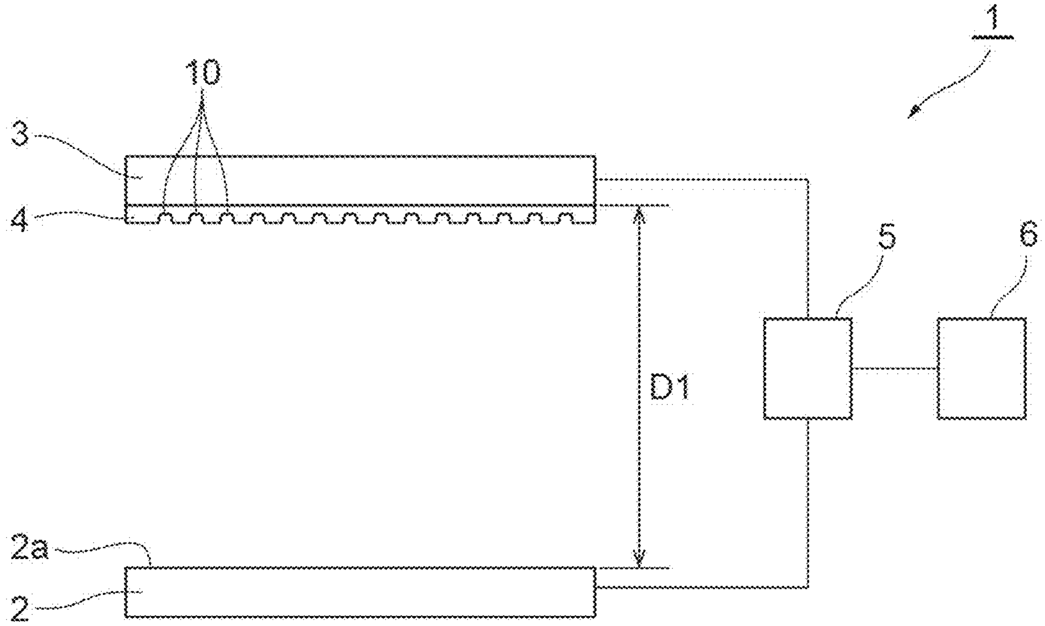
FIG. 1 is a diagram illustrating an outline configuration of an electrostatic attraction device used in a method for classifying solder particles.

FIG. 1 is a diagram showing an outline configuration of an electrostatic attraction device used in the method for classifying solder particles according to the present embodiment.

The electrostatic attraction device 1 includes: a lower electrode (first electrode) 2 having a disposition part 2*a*; an upper electrode (second electrode) 3 having an attraction part 4 that is disposed on the upper side in the gravity direction than the disposition part 2*a* and faces the disposition part 2*a*; a power source 5 connected to the lower electrode 2 and the upper electrode 3; and a control part 6 connected to the power source 5. Solder particles P are disposed on the disposition part 2*a*.

The disposition part 2*a* shown in FIG. 1 is integrated with the main body of the lower electrode and is the surface on the upper electrode 3 side. The disposition part 2*a* may be separately provided on the surface on the upper electrode 3 side of the lower electrode 2.

As the material of the lower electrode 2, a material having electrostatic diffusivity or electrical conductivity can be used. For example, a material having a surface resistivity of $10^{13}\Omega$ or less can be used, and specific examples include metals and glass. The shape of the lower electrode 2 is not particularly limited; however, the shape may be, for example, a flat plate shape or a roll shape.

As the material of the disposition part 2*a* provided on the surface on the upper electrode 3 side of the lower electrode 2, a material having electrostatic diffusivity or electrical conductivity can be used. For example, a material having a surface resistivity of $10^{13}\Omega$ or less can be used, and specific examples include metals, glass, and conductive resins such as conductive polytetrafluoroethylene (PTFE). The shape of the disposition part 2*a* is not particularly limited as long as solder particles can be disposed thereon, and the shape may be a membrane or film formed on the surface of the electrode main body of the lower electrode 2 or may be a shape that can accommodate solder particles, for example, a shape having a bottom face and side faces and opened in the direction of the attraction part.

For a disposition part with electrostatic diffusivity, the surface resistivity may be $10^{13}\Omega$ or less or may be $10^{6}\Omega$ or more. For a disposition part with electrical conductivity, the surface resistivity may be $10^{6}\Omega$ or less or may be $10^{-3}\Omega$ or more.

As the electrode main body constituting the upper electrode 3, an electrode main body having electrostatic diffusivity or electrical conductivity can be used. For example, a material having a surface resistivity of $10^{13}\Omega$ or less can be used, and specific examples include metals and glass. The shape of the electrode main body is not particularly limited; however, the shape may be, for example, a flat plate shape or a roll shape.

The attraction part 4 is provided with a plurality of opening parts 10 opened to the disposition part side. The opening parts 10 may be provided in a predetermined pattern. As the material of the attraction part 4, an insulating material can be used. For example, a material having a surface resistivity of more than $10^{13}\Omega$ can be used. The shape of the attraction part 4 is not particularly limited as long as the above-described opening parts are provided, and the shape may be a membrane or film formed on the surface of the electrode main body of the upper electrode 3 or may be a film separable from the electrode main body of the upper electrode 3.

Figure 2:
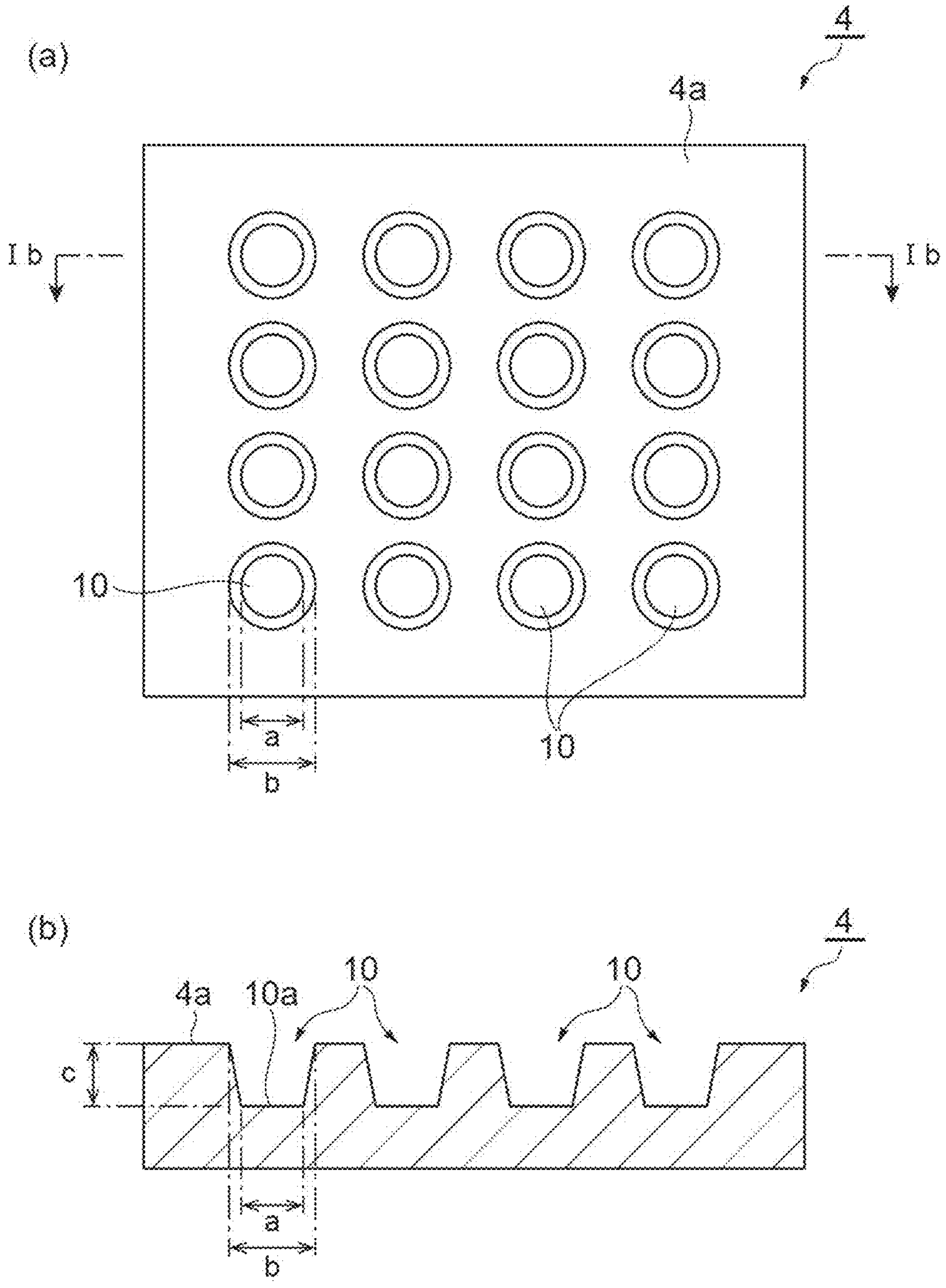
FIG. 2(*a*) is a plan view schematically illustrating an example of an attraction part, and FIG. 2(*b*) is a cross-sectional view taken along line Ib-Ib in FIG. 2(*a*).

FIG. 2(*a*) is a plan view schematically illustrating an example of the attraction part, and FIG. 2(*b*) is a cross-sectional view taken along line Ib-Ib in FIG. 2(*a*). The attraction part 4 shown in FIG. 2(*a*) is provided with a plurality of opening parts (recess parts) 10 having a predetermined pattern (opening pattern). The predetermined pattern (opening pattern) may be a regular arrangement or may be an irregular arrangement.

The opening parts 10 of the attraction part 4 may be formed in a tapered shape in which the opening area is enlarged from the bottom part 10*a* side of an opening part 10 toward the surface 4*a* side of the attraction part 4. That is, as shown in FIGS. 2(*a*) and 2(*b*), it is preferable that the width of the bottom part 10*a* of an opening part 10 (width a in FIGS. 2(*a*) and 2(*b*)) is narrower than the width of the opening at the surface 4*a* of the opening part 10 (width b in FIGS. 2(*a*) and 2(*b*) (hereinafter, also referred to as "opening diameter" of the opening part). The size (width a, width b, volume, the angle and depth of taper, and the like) of the opening parts 10 may be set according to the size of the solder particles to be accommodated.

The width b (opening diameter) of the opening can be appropriately set such that the average particle size of the solder particles P1 to be collected falls in a predetermined range. For example, from the viewpoint of preventing mixing of solder particles having particle sizes other than the target particle size for collecting, the width b of the opening (opening diameter) can be set to 5 to 120 μm, 6 to 120 μm, or 7 to 120 μm.

The width b (opening diameter) of the opening can be appropriately set such that the average particle size of the solder particles P1 to be collected falls in a predetermined range. In addition, from the viewpoint of increasing the collection efficiency, when the average particle size of the solder particles P is designated as MDp (μm), and the opening diameter of the opening parts is designated as OD (μm), MDp/OD may satisfy 0.5 to 1.5, may satisfy 0.75 to 1.25, or may satisfy 0.9 to 1.1.

Incidentally, the shape of the opening parts 10 may be a shape other than the shape shown in FIGS. 2(*a*) and 2(*b*). For example, the shape of the opening at the surface 4*a* may be an elliptical shape, a triangular shape, a quadrangular shape, a polygonal shape, or the like, in addition to a circular shape. The bottom part 10*a* may also have a shape other than a flat surface, and the shape may be, for example, a mountain shape, a valley shape, or an aggregate of fine protrusions. From the viewpoint of increasing the average degree of sphericity of the solder particles P1, the shape of the opening may be a circular shape, an elliptical shape, a triangular shape, a quadrangular shape, or a polygonal shape.

Regarding the solder particles P1 to be accommodated in the opening parts of the attraction part, a particle as a whole does not have to be accommodated inside an opening part, or a portion of a solder particle may be in a state of protruding from the surface 4*a* of the attraction part. For example, a portion of ⅔ or less of the particle size of a particle may be protruding, or a portion of ½ or less may be protruding.

As the material constituting the attraction part 4, for example, inorganic materials such as silicon, various ceramics, glass, and metals such as stainless steel; and organic materials such as various resins, can be used. The opening parts 10 of the attraction part can be formed by known methods such as a photolithography method, nanoimprinting, a mechanical processing method, an electron beam processing method, and a radiation processing method. In addition, the attraction part 4 may be a single layer or may be composed of a plurality of layers, such as a laminated body of a base layer and an opening part layer provided with opening parts. When the attraction part 4 is a laminated body, the attraction part 4 may be, for example, a film including an opening part layer formed by a method such as a photolithography method or nanoimprinting using a photocurable resin composition, on a base layer such as PET.

With regard to the electrostatic attraction device 1, the lower electrode 2 and the upper electrode 3 are disposed with a predetermined interval, and the distance between electrodes DI can be set to 0.5 to 100 mm, may be 1 to 20 mm, or may be 2 to 15 mm.

With regard to the electrostatic attraction device 1, the lower electrode 2 may be movable, and in this case, it is easier to continuously supply solder particles. For example, a lower electrode can be provided on the surface of a belt or a cylindrical-shaped roller.

With regard to the electrostatic attraction device 1, the upper electrode 3 may be movable, and in this case, it is easier to continuously supply the attraction part that attracts solder particles. For example, an upper electrode can be provided on the surface of a belt or a cylindrical-shaped roller.

The power source 5 may be any power source capable of forming an electric field between the lower electrode and the upper electrode, and for example, a known high-voltage power source can be used. The high-voltage power source may be a direct current power source or may be an alternating current power source.

The control part 6 can have, for example, functions such as adjustment of voltage to be applied, duration of application, and the like.

(First Step)

In a first step, an electric field is formed between the first electrode 2 and the second electrode 3 of the electrostatic attraction device 1 to cause the solder particles P disposed on the disposition part 2*a* to be electrostatically attracted to the attraction part 4.

Regarding the solder particles P to be disposed on the disposition part, solder particles produced by a known method can be used, or a commercially available product such as micro solder balls may also be used.

The solder particles may include, for example, tin or a tin alloy. As the tin alloy, for example, an In—Sn alloy, an In—Sn~Ag alloy, a Sn—Au alloy, a Sn—Bi alloy, a Sn—Bi—Ag alloy, a Sn—Ag—Cu alloy, and a Sn—Cu alloy can be used. Specific examples of these tin alloys include the following examples.

In—Sn (In 52% by mass, Sn 48% by mass, melting point 118° C.)

In—Sn—Ag (In 20% by mass, Sn 77.2% by mass, Ag 2.8% by mass, melting point 175° C.)

Sn—Bi (Sn 43% by mass, Bi 57% by mass, melting point 138° C.)

Sn—Bi—Ag (Sn 42% by mass, Bi 57% by mass, Ag 1% by mass, melting point 139° C.)

Sn—Ag—Cu (Sn 96.5% by mass, Ag 3% by mass, Cu 0.5% by mass, melting point 217° C.)

Sn—Cu (Sn 99.3% by mass, Cu 0.7% by mass, melting point 227° C.)

Sn—Au (Sn 21.0% by mass, Au 79.0% by mass, melting point 278° C.)

The solder particles may include, for example, indium or an indium alloy. As the indium alloy, for example, an In—Bi alloy and an In—Ag alloy can be used. Specific examples of these indium alloys include the following examples.

In—Bi (In 66.3% by mass, Bi 33.7% by mass, melting point 72° C.)

In—Bi (In 33.0% by mass, Bi 67.0% by mass, melting point 109° C.)

In—Ag (In 97.0% by mass, Ag 3.0% by mass, melting point 145° C.)

The solder particles may further include one or more selected from Ag, Cu, Ni, Bi, Zn, Pd, Pb, Au, P, and B.

The shape of the solder particles P may be a spherical shape or an approximately spherical shape, or may be a non-spherical shape such as a flaky shape or an elliptical (rugby ball) shape.

As the solder particles P, solder particles having an average particle size of 10 μm or more can be used. In this case, the solder particles P to be disposed on the disposition part can contain a sufficient amount of solder particles that exist as single particles without agglomerating with each other, and it is easier to reduce the CV value of the particle size of the solder particles P1 to be collected.

The average particle size of the solder particles can be determined by randomly measuring the particle sizes of one hundred solder particles from photographs taken with a scanning electron microscope (SEM) by using digital calipers, and calculating an average of these particle sizes. When the solder particles have a shape other than a spherical shape, the average particle size can be determined by measuring the longest diameter of the solder particles by the above-described method.

The CV value of the particle size of the solder particles is calculated by dividing the standard deviation of the particle size measured by the above-described method, by the average particle size, and multiplying the obtained value by 100.

From the viewpoint of reducing the CV value of the particle size of the solder particles P1 to be collected, regarding the solder particles P, the proportion of particles having a particle size of less than 10 μm may be 50% by pieces or less, may be 30% by pieces or less, may be 20% by pieces or less, or may be 10% by pieces or less, and the solder particles P do not have to include particles having a particle size of less than 10 μm.

The unit "% by pieces" means the proportion (percentage) based on the number of pieces. For example, the proportion of particles having a particle size of less than 10 μm can be determined as follows. First, the particle sizes of one hundred solder particles are randomly measured from photographs taken with a SEM by using digital calipers. The number of pieces of the particles having a particle size of less than 10 μm is counted, and by dividing this number of pieces by the total number of pieces (100 pieces) and multiplying the resultant by 100, the proportion of the particles having a particle size of less than 10 μm can be determined. When the solder particles have a shape other than a spherical shape, the longest diameter of the solder particles is used as a particle size.

The solder particles P may be subjected in advance to a treatment of removing solder particles having a particle size of less than 10 μm by known classification methods such as dry classification by sieving and sedimentation classification.

From the viewpoint of preventing mixing of solder particles having a particle size other than the target particle size for collecting, for the solder particles P, the proportion of particles having a particle size of 30 μm or more may be 50% by pieces or less, may be 40% by pieces or less, or may be 30% by pieces or less, and the solder particles P do not have to include particles having a particle size of 30 μm or more.

The solder particles P may be subjected in advance to a treatment of removing solder particles having a particle size of 30 μm or more by known classification methods such as dry classification by sieving and sedimentation classification.

The solder particles P may have an average degree of sphericity of 0.1 or more, 0.3 or more, 0.5 or more, 0.7 or more, 0.8 or more, 0.85 or more, 0.1 to 0.8, or 0.5 to 0.85.

The average degree of sphericity of the solder particles can be determined by randomly measuring the longest diameter and the smallest diameter of one hundred solder particles from photographs taken with a SEM by using digital calipers, calculating the degrees of sphericity defined by the following formula, and calculating an average of these degrees of sphericity.

$$\text{Degree of sphericity} = D_{min}/D_{max}$$

[wherein $D_{max}$ represents the largest diameter (μm) of a particle, and $D_{min}$ represents the smallest diameter (μm) of a particle.]

The average particle size of the solder particles P1 may be 10 to 100 μm, 10 to 80 μm, 10 to 50 μm, 10 to 40 μm, 10 to 35 μm, 10 to 30 μm, 15 to 100 μm, 15 to 50 μm, 15 to 35 μm, 30 to 70 μm, 50 to 80 μm, 50 to 100 μm, or 70 to 100 μm.

The CV value of the particle size of the solder particles P1 may be 1 to 20%, 2 to 18%, or 3 to 15%.

The solder particles P1 may have an average degree of sphericity of 0.90 or more, 0.92 or more, 0.95 or more, 0.98 or more, or 0.985 or more.

Figure 3:
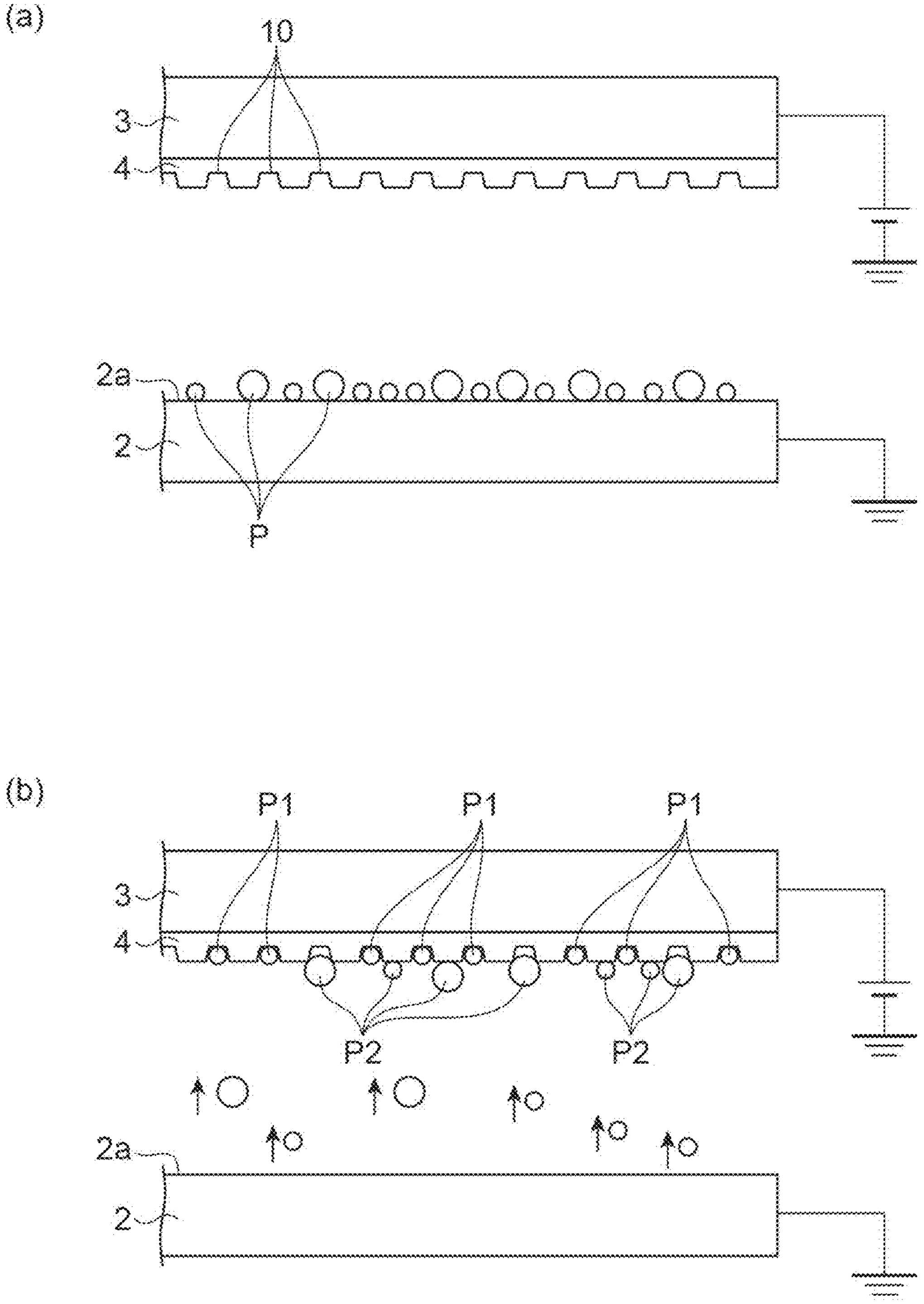
FIG. 3 is schematic diagrams for explaining a method for classifying solder particles.

FIG. 3 is a schematic diagram for explaining the method for classifying solder particles according to the present embodiment. FIG. 3(*a*) shows a state in which solder particles P are disposed on the disposition part. By applying an electric field between a lower electrode (first electrode) and an upper electrode (second electrode), the solder particles P charged to the opposite polarity of the upper electrode on the disposition part, rise due to electrostatic attraction, and the ascended solder particles P are electrostatically attracted to the attraction part. The solder particles electrostatically attracted to the attraction part are divided into solder particles P1 accommodated in the opening parts and solder particles P2 that are not accommodated in the opening parts. Here, solder particles that are attracted to the opening parts but are not accommodated therein (for example, more than ⅔ of the particle sizes protruding from the surface of the attraction part, or being removable by the second step), are included in the solder particles P2.

The strength of the electric field to be applied can be set to 0.1 to 30 kV/cm and may be 0.2 to 30 kV/cm or may be 0.5 to 20 kV/cm.

Application of the electric field may occur continuously or intermittently.

The duration of application of an electric field can be appropriately set according to the amount of solder particles to be attracted to the attraction part.

According to the present embodiment, at the time when the solder particles have sufficiently attracted to the attraction part 4, electrostatic attraction of the solder particles can be stopped by the effect of reducing the electric field caused by attraction of the solder particles to the insulating attraction part 4. That is, since the strength of the electric field between the lower electrode 2 and the upper electrode 3 decreases as more solder particles attach to the attraction part 4, flying up of solder particles may be stopped by making the electric field between electrodes sufficiently small, besides that the solder particles on the disposition part disappear. When this phenomenon is utilized, and it is arranged such that a sufficient amount of solder particles can be supplied by making the lower electrode 2 movable or replenishing the disposition part with solder particles, solder particles can be attracted to the attraction part until the electric field becomes sufficiently weak.

In the above-mentioned electrostatic attraction device, the first electrode and the second electrode are disposed on the lower side and the upper side, respectively, in the direction of gravity; however, in the method for classifying solder particles according to the present embodiment, the direction of movement of the solder particles may be horizontal or may be inclined with respect to the direction of gravity. Even in these cases, the first electrode and the second electrode can be configured as described above.

(Second Step)

In a second step, solder particles P2 (surplus particles) that are attracted to the attraction part 4 and are not accommodated in the opening parts 10, are removed.

Examples of a method for removing surplus particles include means for physically removing particles, such as air blow, a brush, and a squeegee; and means for electrostatically removing particles, such as an ionizer.

Figure 4:
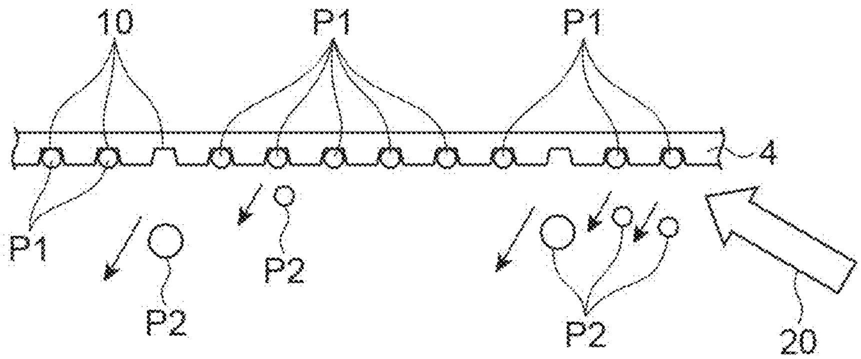
FIG. 4 is schematic diagrams for explaining the method for classifying solder particles.
Figure 4:
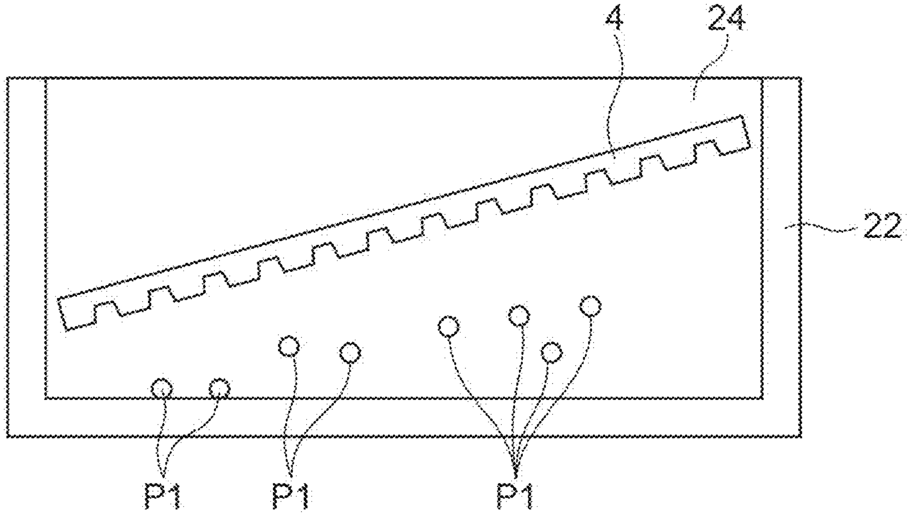

FIG. 4 is a schematic diagram for explaining the method for classifying solder particles according to the present embodiment. FIG. 4(*a*) shows an embodiment in which solder particles P2 that are attracted to the attraction part 4 and are not accommodated in the opening parts 10, are removed by air blow 20.

The removed surplus particles may be collected and recycled.

(Third Step)

In a third step, the solder particles P1 accommodated in the opening parts are collected from the attraction part that has been subjected to the second step.

Examples of the method for collecting include ultrasonic dispersion, collection by air force, and particle collection by impact on the attraction part.

FIG. 4(*b*) shows an embodiment in which the attraction part 4 is immersed in a liquid 24 such as any organic solvent in an ultrasonic dispersing device 22, and solder particles P1 accommodated in the opening parts 10 are being dispersed in the liquid 24 by means of ultrasonic waves.

The solder particles P1 can be collected through the third step. The collected solder particles P1 may be used as they are, as solder particles with a reduced CV value of the particle size, or may be used as a mixture with other solder particles. The collected solder particles P1 may be further subjected to another classification treatment.

The method for classifying solder particles according to the present embodiment can reduce problems such as a decrease in productivity due to clogging, and damage to the solder particle surfaces, which are likely to occur in a method of classifying particles using a sieve.

By utilizing the method for classifying solder particles according to the present embodiment, solder particles having a desired average particle size and having a reduced CV value of the particle size can be manufactured. That is, the method for classifying solder particles according to the present embodiment can be utilized as a method for manufacturing low-dispersity or monodisperse solder particles.

Furthermore, by utilizing the method for classifying solder particles according to the present embodiment, solder particles having a desired average particle size and having a reduced CV value of the particle size and an increased average degree of sphericity can be manufactured. That is, the method for classifying solder particles according to the present embodiment can be utilized as a method for manufacturing solder particles with low dispersity and a high degree of sphericity.

[Solder Particles]

Solder particles according to the present embodiment have an average particle size of 10 to 100 μm and a CV value of the particle size of 1 to 30%.

The solder particles according to the present embodiment may have an average particle size of 10 to 30 μm and a CV value of the particle size of 3 to 15%.

The solder particles according to the present embodiment may have an average particle size of 30 to 70 μm and a CV value of the particle size of 3 to 15%.

The solder particles according to the present embodiment may have an average particle size of 70 to 100 μm and a CV value of the particle size of 3 to 15%.

The solder particles according to the present embodiment may have an average particle size of 10 to 100 μm, a CV value of the particle size of 3 to 15%, and an average degree of sphericity of 0.90 or more.

The solder particles according to the present embodiment may have an average particle size of 10 to 50 μm, a CV value of the particle size of 3 to 15%, and an average degree of sphericity of 0.90 or more.

As all the above-mentioned solder particles have the above-described configurations, it is possible to cope with the requirements of maintaining the gaps between electrodes and wirings constant during mounting in surface mounting, and suppressing gap variations in each wiring, and at the same time, it can be said that productivity is excellent from the viewpoint that the above-mentioned solder particles can be manufactured from solder particles manufactured by a conventional method, by using the above-mentioned method for classifying solder particles.

The material and shape of the solder particles according to the present embodiment can be similar to those of the above-mentioned solder particles P.

From the viewpoint of promoting the achievement of both cost and monodispersity, the solder particles according to the present embodiment may have an average particle size of 10 to 100 μm, 10 to 80 μm, 10 to 50 μm, 10 to 40 μm, 10 to 35 μm, 10 to 30 μm, 15 to 100 μm, 15 to 50 μm, 15 to 35 μm, 30 to 70 μm, 50 to 80 μm, 50 to 100 μm, or 70 to 100 μm, and may have a CV value of the particle size of 1 to 20%, 2 to 18%, or 3 to 15%.

From the viewpoint of connection stability, the solder particles according to the present embodiment may have an average degree of sphericity of 0.90 or more, 0.92 or more, 0.95 or more, 0.98 or more, or 0.985 or more. When the average degree of sphericity is in the above-described range, variations in height are less likely to occur in the solder particles captured between the electrodes during mounting or in the solder bumps formed on the electrodes, and solder particles that are not involved in connection can be further reduced.

Incidentally, sedimentation classification and mesh classification are known as general classification methods; however, in these methods, solder particles having the above-mentioned average degree of sphericity cannot be obtained for the following reasons. That is, since sedimentation classification allows classification by specific gravity, precise classification from the viewpoint of shape (degree of sphericity) cannot be achieved, and since mesh classification is classification using a mesh, particles having a high aspect ratio (for example, rugby ball-shaped particles) also pass through the mesh, and therefore, precise classification from the viewpoint of shape (degree of sphericity) cannot be achieved.

[Solder Classification System]

A solder classification system according to the present embodiment includes: an electrostatic attraction device including a first electrode having a disposition part having electrostatic diffusivity or electrical conductivity, and a second electrode having an attraction part having electrical insulation properties, which faces the disposition part and is provided with a plurality of opening parts opened to the disposition part side; a removing means for removing solder particles that are attracted to the attraction part and are not accommodated in the opening parts, from the attraction part; and a collecting means for collecting solder particles accommodated in the opening parts of the attraction part.

The electrostatic attraction device, the removing means, and the collecting means can be configured similarly to those used in the above-mentioned method for classifying solder particles.

According to the above-described solder particle classification system, the above-mentioned method for classifying solder particles can be carried out, and solder particles having a small CV value of the particle size (coefficient of variation in the particle size) can be obtained. In addition, the average particle size of the solder particles to be obtained can be easily changed by regulating the opening diameter of the opening parts. Therefore, the above-described solder particle classification system can be applied as a manufacturing system for monodisperse solder particles.

[Adhesive Composition]

An adhesive composition according to the present embodiment includes an adhesive component and the above-mentioned solder particles according to the present embodiment.

Examples of the adhesive component include a monomer (main agent) and a curing agent. Regarding the monomer, a cationic polymerizable compound, an anionic polymerizable compound, or a radically polymerizable compound can be used. As the cationic polymerizable compound or anionic polymerizable compound, an epoxy-based compound may be mentioned.

As the epoxy-based compound, a bisphenol type epoxy resin derived from epichlorohydrin and a bisphenol compound such as bisphenol A, bisphenol F, or bisphenol AD; an epoxy novolac resin derived from epichlorohydrin and a novolac resin such as phenol novolac or cresol novolac; and various epoxy compounds having two or more glycidyl groups in one molecule, such as glycidylamine, glycidyl ether, biphenyl, and alicyclic compounds, can be used. The epoxy-based compound may be an oligomer.

As the radically polymerizable compound, a compound having a functional group that is polymerized by radicals can be used, and examples include an acrylic compound such as a (meth)acrylate, a maleimide compound, and a styrene derivative. The radically polymerizable compound can be used in the form of either a monomer or an oligomer, and a mixture of a monomer and an oligomer may also be used. That is, according to the present specification, a monomer also includes an oligomer.

Regarding the monomer, one kind thereof may be used alone, or two or more kinds thereof may be used in combination.

In the case of using an epoxy-based compound, examples of the curing agent include an imidazole-based agent, a hydrazide-based agent, a boron fluoride-amine complex, a sulfonium salt, an onium salt, a pyridium salt, amineimide, a salt of polyamine, dicyandiamide, and an acid anhydride. It is suitable that these curing agents are microencapsulated by being coated with a polyurethane-based or polyester-based polymer substance, from the viewpoint that the working life is extended.

A curing agent that is used in combination with an epoxy-based compound is appropriately selected according to the intended connection temperature, connection time, storage stability, and the like. From the viewpoint of high reactivity, the curing agent may be such that, when a composition including an epoxy-based compound and a curing agent is used, the gelation time of the composition is within 10 seconds at a predetermined temperature, and from the viewpoint of storage stability, the curing agent may be such that there is no difference in the gelation time between a fresh composition and the composition after storage in a constant-temperature chamber at 40° C. for 10 days. From these viewpoints, the curing agent may be a sulfonium salt.

In the case of using an acrylic compound, the curing agent may be a compound that is decomposed by heating and generates a free radical, such as a peroxide compound or an azo-based compound.

A curing agent that is used in combination with an acrylic compound is appropriately selected according to the intended connection temperature, connection time, storage stability, and the like. From the viewpoints of high reactivity and storage stability, the curing agent may be an organic peroxide or an azo-based compound, for which the temperature at a half-life of 10 hours is 40° C. or higher, and the temperature at a half-life of 1 minute is 180° C. or lower, or the curing agent may be an organic peroxide or an azo-based compound, for which the temperature at a half-life of 10 hours is 60° C. or higher, and the temperature at a half-life of 1 minute is 170° C. or lower.

Regarding the curing agent, one kind thereof may be used alone, or two or more kinds thereof may be used in combination. The adhesive composition may further contain a decomposition accelerator, an inhibitor, and the like.

From the viewpoint of obtaining a sufficient reaction rate when the connection time is set to 10 seconds or less regardless of which monomer between an epoxy-based compound or an acrylic compound is used, the blending amount of the curing agent may be 0.1 parts by mass or more and 40 parts by mass or less, or may be 1 part by mass or more and 35 parts by mass or less, with respect to 100 parts by mass of the sum of the monomer and the film-forming material that will be described below. When the blending amount of the curing agent is 0.1 parts by mass or more, a sufficient reaction rate can be obtained while satisfactory adhesive strength and small connection resistance are likely to be obtained, and when the blending amount is 40 parts by mass or less, it is easy to prevent an increase in the connection resistance caused by a decrease in the fluidity of the adhesive composition, while it is easy to secure the storage stability of the adhesive composition.

The film-forming material is preferably a polymer having an action of facilitating the handling of a low-viscosity composition including the above-described monomer and curing agent. By using a film-forming material, the film can be suppressed from easily tearing, cracking, or becoming sticky, and an adhesive film such as an anisotropically conductive film that is easily handleable can be obtained.

The adhesive composition according to the present embodiment may further include a film-forming material.

As the film-forming material, a thermoplastic resin can be suitably used. Examples include a phenoxy resin, a polyvinyl formal resin, a polystyrene resin, a polyvinyl butyral resin, a polyester resin, a polyamide resin, a xylene resin, a polyurethane resin, a polyacrylic resin, and a polyester urethane resin. In these polymers, a siloxane bond or a fluorine substituent may be included. Among the above-described resin, a phenoxy resin can be used from the viewpoints of adhesive strength, compatibility, heat resistance, and mechanical strength.

Regarding the above-described thermoplastic resin, one kind thereof may be used alone, or two or more kinds thereof may be used in combination.

With regard to the thermoplastic resin, as the molecular weight is larger, the film-forming properties are easily obtained, and the melt viscosity, which affects the fluidity of the adhesive composition, can be set over a wide range. The weight average molecular weight of the thermoplastic resin may be 5000 or more and 150000 or less, or may be 10000 or more and 80000 or less. When the weight average molecular weight of the thermoplastic resin is 5000 or more, satisfactory film-forming properties are likely to be obtained, and when the weight average molecular weight is 150000 or less, satisfactory compatibility with other components is likely to be obtained.

Incidentally, according to the present disclosure, the weight average molecular weight of the thermoplastic resin refers to a value measured by gel permeation chromatography (GPC) by using a calibration curve based on polystyrene standards, according to the following conditions.

(Measurement Conditions)

Apparatus: GPC-8020 manufactured by Tosoh Corporation

Detector: RI-8020 manufactured by Tosoh Corporation

Column: Gelpack GLA160S+GLA150S manufactured by Hitachi Chemical Company, Ltd.

Sample concentration: 120 mg/3 mL

Solvent: Tetrahydrofuran

Injection amount: 60 μL

Pressure: 2.94×106 Pa (30 $kgf/cm^2$)

Flow rate: 1.00 mL/min

The blending amount of the film-forming material may be 5% by mass or more and 80% by mass or less, or may be 15% by mass or more and 70% by mass or less, based on the total amount of the monomer, the curing agent, and the film-forming material. By setting the blending amount of the film-forming material to 5% by mass or more, satisfactory film-forming properties are likely to be obtained, and by setting the blending amount to 80% by mass or less, the adhesive composition tends to exhibit satisfactory fluidity.

The content of the solder particles in the adhesive composition according to the present embodiment may be in the range of 5 to 80 parts by volume or may be 10 to 70 parts by volume, with respect to 100 parts by volume of the total amount of the adhesive composition.

In addition, the content of the solder particles may be 5 to 80% by mass, 10 to 70% by mass, or 20 to 60% by mass, based on the total amount of the adhesive composition.

The adhesive composition may further contain other additives such as a filler, a softening agent, a promoting agent, an aging inhibitor, a colorant, a flame retardant, a thixotropic agent, and a coupling agent.

According to the adhesive composition according to the present embodiment, an adhesive film such as an anisotropically conductive film can be produced.

[Adhesive Film]

An adhesive film according to the present embodiment includes an adhesive component and the above-mentioned solder particles according to the present embodiment. The adhesive film can have a composition similar to that of the above-mentioned adhesive composition according to the present embodiment.

The adhesive film according to the present embodiment can be produced by the following method. A varnish composition (varnish-like adhesive composition) prepared by mixing with stirring or kneading the adhesive composition according to the present embodiment in an organic solvent is prepared. Thereafter, an adhesive film can be formed on a base material by applying the varnish composition on a base material that has been subjected to a release treatment, by using a knife coater, a roll coater, an applicator, a comma coater, a die coater, or the like, and then volatilizing the solvent by heating.

As the solvent used for the preparation of the varnish composition, a solvent having the characteristic that can uniformly dissolve or disperse each component may be used. Examples of such a solvent include toluene, acetone, methyl ethyl ketone, methyl isobutyl ketone, ethyl acetate, propyl acetate, and butyl acetate. These solvents can be used singly or in combination of two or more kinds thereof. Mixing with stirring and kneading at the time of preparing the varnish composition can be carried out by, for example, using a stirrer, a Raikai mixer, a three-roll, a ball mill, a bead mill, or a Homodisper.

The base material is not particularly limited as long as it has heat resistance that can withstand the heating conditions at the time of volatilizing the solvent, and for example, base materials (for example, a film) formed of stretched polypropylene (OPP), polyethylene terephthalate (PET), polyethylene naphthalate, polyethylene isophthalate, polybutylene terephthalate, polyolefin, polyacetate, polycarbonate, polyphenylene sulfide, polyamide, polyimide, cellulose, an ethylene-vinyl acetate copolymer, polyvinyl chloride, polyvinylidene chloride, a synthetic rubber system, and a liquid crystalline polymer can be used. The heating conditions at the time of volatilizing the solvent from the varnish composition applied on the base material may be conditions in which the solvent is sufficiently volatilized. The heating conditions may be, for example, 40° C. or higher and 120° C. or lower and 0.1 minutes or more and 10 minutes or less.

The adhesive film according to the present embodiment may be such that a portion of the solvent remains without being removed. The content of the solvent in the adhesive film according to the present embodiment may be, for example, 10% by mass or less or may be 5% by mass or less, based on the total mass of the adhesive film.

The thickness of the adhesive film may be, for example, 0.5 to 500 μm, may be 1 to 100 μm, or may be 1 to 20 μm.

The adhesive film according to the present embodiment may have a single layer structure or may have a multilayer structure having two or more layers. For example, the adhesive film may have a two-layer structure including a layer including solder particles (a first adhesive layer composed of an adhesive component and solder particles) and a layer that does not include solder particles (a second adhesive layer composed of an adhesive component). For example, the adhesive film may have a three-layer structure including a layer including solder particles (a first adhesive layer composed of an adhesive component and solder particles), a first layer that does not include solder particles (a second adhesive layer composed of an adhesive component), and a second layer that does not include solder particles (a third adhesive layer composed of an adhesive component). When the adhesive film has a multilayer structure having two or more layers, a portion of the solder particles may protrude from the layer including the solder particles toward the layer that does not include solder particles. When the adhesive film has a multilayer structure having two or more layers, the type and content of each component contained in each of the adhesive layers, the layer thickness, and the like may be the same or may be different. When the adhesive film has a multilayer structure having two or more layers, each layer may be in an uncured state, or a portion thereof may be in a cured state.

The adhesive film according to the present embodiment may include conductive particles other than the solder particles. The conductive particles are not particularly limited as long as they are particles having electrical conductivity, and may be metal particles composed of a metal such as Au, Ag, Ni, or Cu, conductive carbon particles composed of conductive carbon, or the like. The conductive particles may be coated conductive particles, each including: a core including non-conductive glass, ceramic, plastic (polystyrene or the like), or the like; and a coating layer covering the core and including the above-described metal or conductive carbon. Among these, metal particles formed of a heat-fusible metal, or coated conductive particles each including a core including a plastic and a coating layer including a metal or conductive carbon and covering the core, are preferably used. The conductive particles may also be insulating coated conductive particles, each including the above-described metal particle, conductive carbon particle, or coated conductive particle, and an insulating layer that includes an insulating material such as a resin and covers the surface of the particle.

The adhesive film according to the present embodiment can be used as an anisotropic conductive film or an isotropic conductive film. In addition, the adhesive film according to the present embodiment can be used as an adhesive film for circuit connection intended for connecting circuit members to each other. Examples of the circuit member include inorganic substrates of semiconductors, glass, ceramics, and the like; polyimide substrates represented by TCP, FPC, and COF; substrates obtained by forming electrodes on films of polycarbonate, polyester, polyether sulfone, and the like; and printed wiring boards.

EXAMPLES

Hereinafter, the present disclosure will be described even more specifically by way of Examples and Comparative Examples; however, the present disclosure is not intended to be limited to the following Examples.

[Solder Particles]

(Solder Particles-1)

Spherical solder particles (material: Sn 43% by mass, Bi 57% by mass, melting point: 138° C.) having a particle size distribution with a particle size of 1 to 5 μm were prepared.

(Solder Particles-2)

Spherical solder particles (material: Sn 43% by mass, Bi 57% by mass, melting point: 138° C., proportion of particles having a particle size of 30 μm or more: 20% by pieces) having a particle size distribution with a particle size of 20 to 38 μm were prepared.

(Solder Particles-3)

Spherical solder particles (material: Sn 43% by mass, Bi 57% by mass, melting point: 138° C.) having a particle size distribution with a particle size of 8 to 12 μm were prepared.

(Solder Particles-4)

Spherical solder particles (material: Sn 96.5% by mass, Ag 3% by mass, Cu 0.5% by mass, melting point: 217° C.) having a particle size distribution with a particle size of 12 to 18 μm were prepared.

(Solder Particles-5)

Spherical solder particles (material: Sn 43% by mass, Bi 57% by mass, melting point: 138° C.) having a particle size distribution with a particle size of 25 to 40 μm were prepared.

[Production of Attraction Part]

Production Example 1

A UV-curable resin was applied on a PET film having a thickness of 50 μm, and the UV-curable resin was irradiated with UV while pressing a mold having a predetermined convex pattern thereon to prepare a resin film provided with a plurality of opening parts. Incidentally, the opening parts were formed into a shape in which a, b, and c in FIG. 2(*b*) were 20 μm, 22 μm, and 20 μm, respectively. In addition, the shortest distance between adjacent openings in the resin film was 20 μm.

Production Example 2

A resin film was prepared in the same manner as in Production Example 1, except that the opening parts were formed into a shape in which a, b, and c in FIG. 2(*b*) were 10 μm, 12 μm, and 10 μm, respectively, and that the shortest distance between adjacent openings in the resin film was 10 μm.

Production Example 3

A resin film was prepared in the same manner as in Production Example 1, except that the opening parts were formed into a shape in which a, b, and c in FIG. 2(*b*) were 15 μm, 18 μm, and 15 μm, respectively, and that the shortest distance between adjacent openings in the resin film was 15 μm.

Production Example 4

A resin film was prepared in the same manner as in Production Example 1, except that the opening parts were formed into a shape in which a, b, and c in FIG. 2(*b*) were 30 μm, 34 μm, and 30 μm, respectively, and that the shortest distance between adjacent openings in the resin film was 30 μm.

[Classification of Solder Particles]

Example 1

A device having a configuration similar to that of the electrostatic attraction device 1 of the above-mentioned embodiment was prepared, an aluminum plate (thickness 1 mm) was used as the lower electrode 2, an aluminum plate (thickness 1 mm) in which one principal surface was covered with the resin film of Production Example 1 was used as the upper electrode 3, and the distance between electrodes was set to 5 mm.

Solder particles-2 were sprayed on the surface of an aluminum plate (lower electrode), and a voltage of 3.0 kV was applied between the electrodes for 5 seconds to cause the solder particles to be electrostatically attracted to the resin film as the attraction part. Thereafter, surplus particles were removed by air blow.

The resin film from which surplus particles had been removed was immersed in isopropyl alcohol, subjected to ultrasonic dispersion, and then left to stand, and solder particles immersed in isopropyl alcohol were collected.

Example 2

Solder particles were collected in the same manner as in Example 1, except that solder particles-3 were sprayed on the surface of the aluminum plate (lower electrode) instead of the solder particles-2, and an aluminum plate (thickness 1 mm) in which one principal surface was covered with the resin film of Production Example 2 was used as the upper electrode 3.

Example 3

Solder particles were collected in the same manner as in Example 1, except that solder particles-4 were sprayed on the surface of the aluminum plate (lower electrode) instead of the solder particles-2, and an aluminum plate (thickness 1 mm) in which one principal surface was covered with the resin film of Production Example 3 was used as the upper electrode 3.

Example 4

Solder particles were collected in the same manner as in Example 1, except that solder particles-5 were sprayed on the surface of the aluminum plate (lower electrode) instead of the solder particles-2, and an aluminum plate (thickness 1 mm) in which one principal surface was covered with the resin film of Production Example 4 was used as the upper electrode 3.

Comparative Example 1

Solder particles were collected in the same manner as in Example 1, except that solder particles-1 were sprayed on the surface of the aluminum plate (lower electrode) instead of the solder particles-2.

(Evaluation of Solder Particles)

Photographs of solder particles-1, solder particles-2, solder particles-3, solder particles-4, solder particles-5, and the solder particles collected in Examples 1 to 4 and Comparative Example 1 were taken with a SEM. The diameters of one hundred particles were randomly measured from the obtained photographs by using digital calipers, and the average particle sizes, the CV values of the particle size, and the average degrees of sphericity were calculated. The results are shown in Table 1.

Figure 5:
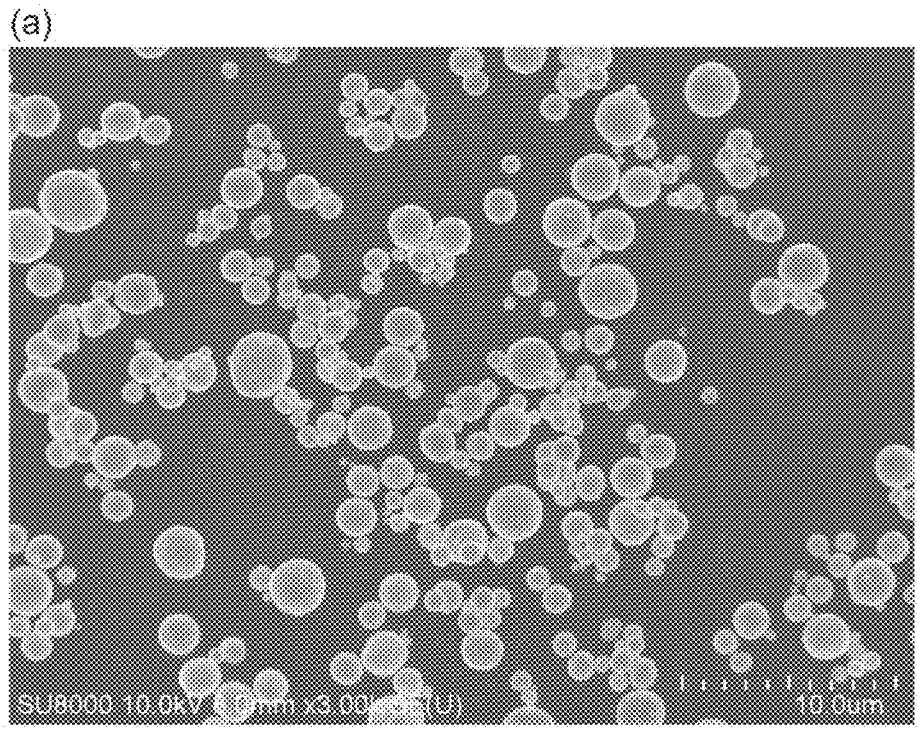
FIG. 5 is SEM images of solder particles-1 and solder particles-2.
Figure 5:
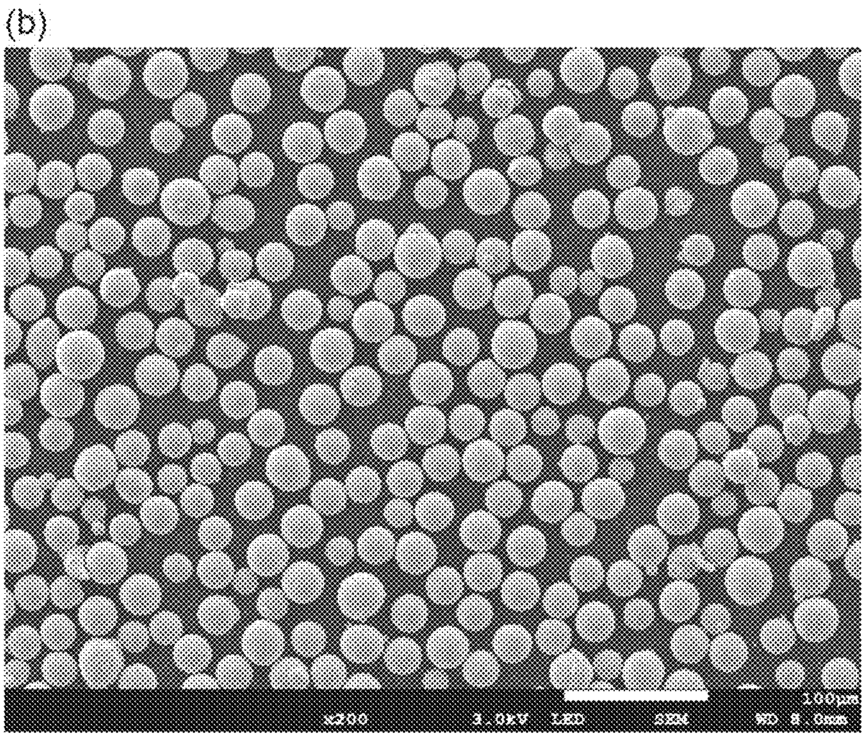
Figure 6:
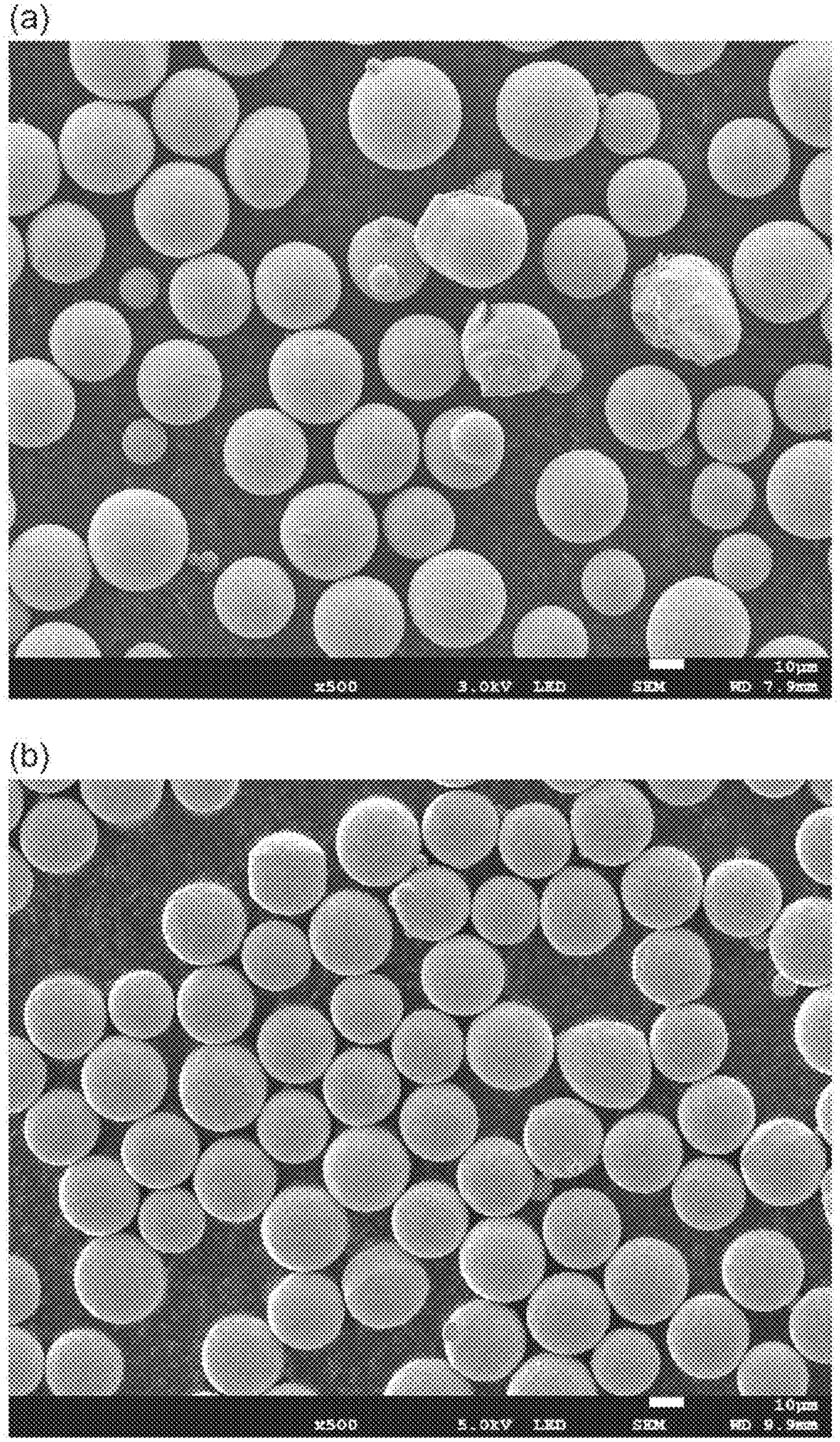
FIG. 6 is SEM images of solder particles before and after classification in Example 1.
Figure 7:
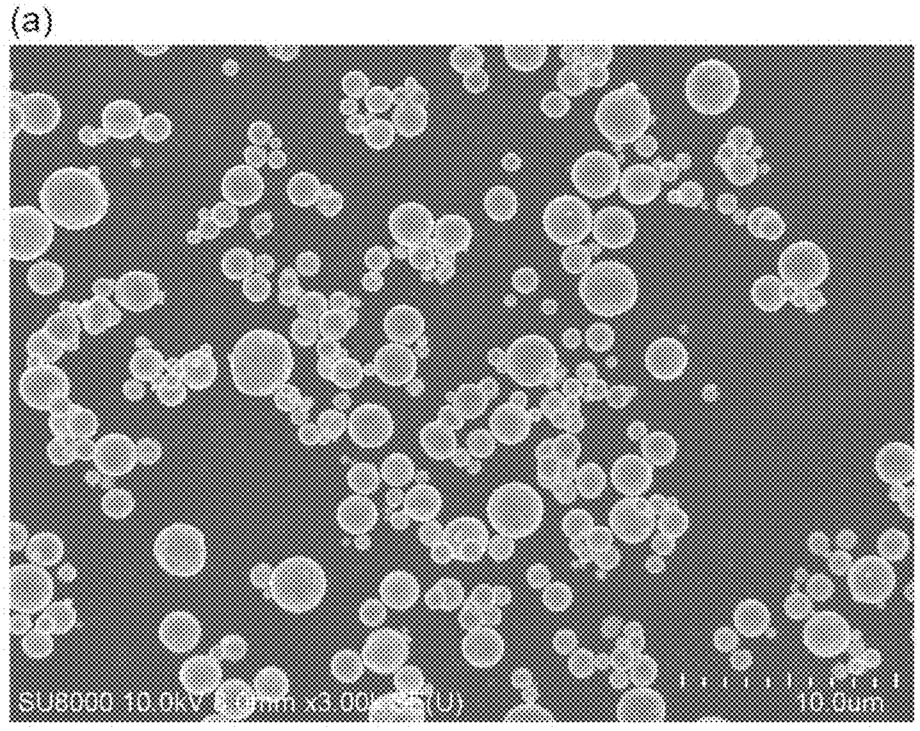
FIG. 7 is SEM images of solder particles before and after classification in Comparative Example 1.
Figure 7:
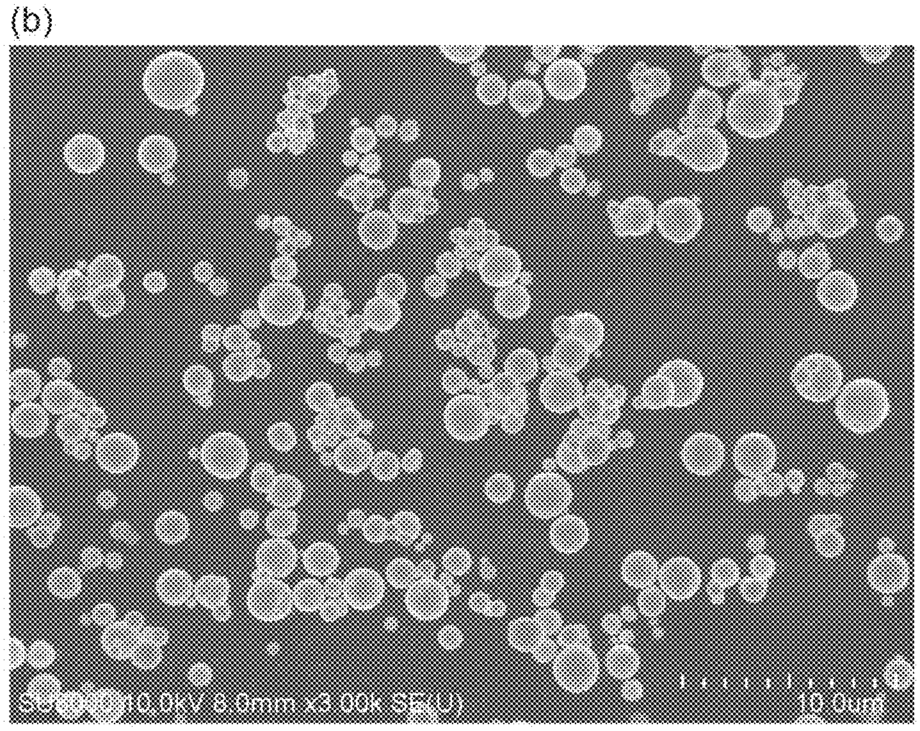

Incidentally, FIG. 5(*a*) shows a SEM image (magnification: 3000 times) of the solder particles-1, and FIG. 5(*b*) shows a SEM image (magnification: 200 times) of the solder particles-2. FIG. 6 shows SEM images (magnification: 500 times) of the solder particles before and after classification in Example 1, and FIG. 6(*a*) shows the particles before classification, while FIG. 6(*b*) shows the particles after classification. FIG. 7 shows SEM images (magnification: 3000 times) of the solder particles before and after classification in Comparative Example 1, and FIG. 7(*a*) shows the particles before classification, while FIG. 7(*b*) shows the particles after classification.

TABLE 1

| | Disposed solder particles P | | | | Collected solder particles P1 | | |
|---|---|---|---|---|---|---|---|
| | Type | Average particle size (μm) | CV value | Average degree of sphericity | Average particle size (μm) | CV value | Average degree of sphericity |
| Example 1 | Solder particles-2 | 22.96 | 18.39 | 0.742 | 22.72 | 5.18 | 0.985 |
| Example 2 | Solder particles-3 | 11.81 | 21.48 | 0.811 | 10.32 | 10.91 | 0.966 |
| Example 3 | Solder particles-4 | 14.13 | 17.73 | 0.843 | 15.81 | 7.25 | 0.989 |
| Example 4 | Solder particles-5 | 33.11 | 18.61 | 0.802 | 31.51 | 5.05 | 0.982 |
| Comparative Example 1 | Solder particles-1 | 1.57 | 32.39 | 0.879 | 1.71 | 29.33 | 0.885 |

REFERENCE SIGNS LIST

1: electrostatic attraction device, 2: lower electrode (first electrode), 2*a*: disposition part, 3: upper electrode (second electrode), 4: attraction part, 5: power source, 6: control part, 10: opening part, P, P1, P2: solder particle.

The invention claimed is:

1. A method for classifying solder particles, the method comprising:

a first step of forming an electric field between a first electrode and a second electrode included in an electrostatic attraction device, the first electrode having a disposition part having electrostatic diffusivity or electrical conductivity, the second electrode having an attraction part having electrical insulation properties, which faces the disposition part and is provided with a plurality of opening parts opened to the disposition part side, so as to cause solder particles P disposed on the disposition part to be electrostatically attracted to the attraction part;

a second step of removing solder particles P2 that are attracted to the attraction part and are not accommodated in the opening parts, from the attraction part; and a third step of collecting solder particles P1 accommodated in the opening parts, from the attraction part that has been subjected to the second step, wherein the solder particles P have an average particle size of 10 μm or more.

2. The method for classifying solder particles according to claim 1, wherein the solder particles P are such that a proportion of particles having a particle size of less than 10 μm is 30% by pieces or less.

3. The method for classifying solder particles according to claim 1, wherein when an average particle size of the solder particles P is designated as MDp (μm), and an opening diameter of the opening parts is designated as OD (μm), MDp/OD satisfies 0.5 to 1.5.

4. Solder particles having an average particle size of 10 to 100 μm, a CV value of particle size of 3 to 15%, and an average degree of sphericity of 0.90 or more.

5. The solder particles according to claim 4, wherein the average particle size is 10 to 50 μm.

6. An adhesive composition comprising an adhesive component and the solder particles according to claim 4.

7. An adhesive film comprising an adhesive component and the solder particles according to claim 4.

8. A solder particle classification system, comprising:

an electrostatic attraction device including a first electrode having a disposition part having electrostatic diffusivity or electrical conductivity, and a second electrode having an attraction part having electrical insulation properties, which faces the disposition part and is provided with a plurality of opening parts opened to the disposition part side;

a removing means for removing solder particles that are attracted to the attraction part and are not accommodated in the opening parts, from the attraction part; and a collecting means for collecting solder particles accommodated in the opening parts of the attraction part.

* * * * *